United States Patent [19]

Watanabe et al.

[11] Patent Number: 4,761,581
[45] Date of Patent: Aug. 2, 1988

[54] MAGNETIC WEDGE

[75] Inventors: Masatoshi Watanabe; Miyoshi Takahashi; Masaki Sato, all of Hitachi; Motoya Ito, Katsuta; Keiji Arai, Kitaibaraki, all of Japan

[73] Assignee: Hitachi, Ltd., Tokyo, Japan

[21] Appl. No.: 46,196

[22] Filed: May 5, 1987

[30] Foreign Application Priority Data

May 9, 1986 [JP] Japan ................... 61-104624

[51] Int. Cl.$^4$ .............................................. H02K 3/48
[52] U.S. Cl. ...................................... 310/214; 310/43; 335/303; 336/178
[58] Field of Search ................. 310/214, 215, 43, 45, 310/194; 336/165, 178; 335/303

[56] References Cited

U.S. PATENT DOCUMENTS

| 2,201,699 | 5/1940 | Myers | 310/214 |
| 2,451,633 | 10/1948 | Perrigo | 310/214 |

FOREIGN PATENT DOCUMENTS

| 0094092 | 8/1923 | Austria | 310/214 |
| 0621816 | 2/1934 | Fed. Rep. of Germany | 310/214 |
| 1197175 | 7/1965 | Fed. Rep. of Germany | 310/214 |
| 2136893 | 2/1973 | Fed. Rep. of Germany | 310/214 |
| 0111452 | 4/1935 | Japan . | |
| 0005659 | 4/1939 | Japan . | |
| 0006906 | 1/1977 | Japan . | |
| 0039408 | 4/1978 | Japan . | |
| 0109149 | 8/1980 | Japan | 310/214 |
| 0149490 | 10/1961 | U.S.S.R. | 310/214 |
| 0630710 | 10/1978 | U.S.S.R. | 310/214 |
| 0668043 | 6/1979 | U.S.S.R. | 310/214 |
| 0936235 | 6/1982 | U.S.S.R. | 310/214 |
| 1193745 | 11/1985 | U.S.S.R. | 310/214 |

Primary Examiner—R. Skudy
Attorney, Agent, or Firm—Antonelli, Terry & Wands

[57] ABSTRACT

A magnetic wedge for use in an electromagnetic device, arranged at the opening portion of a core slot for receiving a winding, comprising a magnetic member consisting of a group of magnetic strips arranged in non-contact from one another and at a predetermined inclination angle for the depth direction of the core slot, and a plastic member for molding said magnetic member. Such a construction of the wedge permits the magnetic property at the opening portion of a core slot to be improved.

5 Claims, 4 Drawing Sheets

MAGNETIC WEDGE

BACKGROUND OF THE INVENTION

This invention relates to an improvement of a magnetic wedge for use in an electromagnetic device, particularly a rotating electric machine, and more particularly to an improvement of a magnetic wedge with a magnetic member molded with a plastic member.

As well known, a winding of the rotating electric machine is received in a core slot, and to this end the wedge is provided at the opening of the core slot.

This wedge is generally constructed of a non-magnetic material having a small permeability, but in the rotating electric machine with a small air gap between a stator and a rotor, e.g. an induction motor, the wedge having a certain magnetic property is used in order to restrain some ripple of magnetic flux distribution in the air gap due to the presence of the core slot and core loss or increase of an excited current due to the concentration of magnetic flux to core tooth portions. Such an wedge is generally called a magnetic wedge. In order to make uniform the magnetic flux distribution in the air gap between a stator and a rotor and the core tooth portions, the magnetic resistance for the magnetic flux passing from the core tooth portion to the air gap side via the wedge should be as small as possible, and on the other hand, the magnetic resistance for the "leak magnetic flux" passing from one tooth portion to the other tooth portion via the wedge due to the difference in the magnetic potentials at the core tooth portions at both ends of the core slot should be as high as possible. In other words, the magnetic wedge only having a strong magnetic property (i.e. large permeability) is insufficient and it is desired to have magnetic anisotropy passing the magnetic flux only in a specific direction.

Known examples of the construction of such a magnetic wedge having magnetic anisotropy are as follows.

In one example, magnetic members are arranged only in the neighborhood of the tooth portions of both sides of a core slot in its width direction, and these magnetic members are unified by connection means of non-magnetic material or plastic member such as resin. The magnetic wedge having such a construction is dislosed in, for example, Japanese Utility Model Publication No. 5659/1939 and Japanese Patent Publication No. 1332/1935 (Japanese Patent No. 111,452).

In another example, flat magnetic particles, with the direction of their flat plane aligned with that of the thickness of the wedge, are molded by resin, or the like. This construction is disclosed in, for example, JP-A-52-6906 (1977).

Although the magnetic wedge used in an electric rotating machine is desired to have a magnetic anisotropy as mentioned above, from the viewpoint of the magnetic property, when also considering the actual use, it must have mechanical strength enough to be able to serve as a winding support, which is in intrinsic function of the wedge, and be easy to fabricate.

The above mentioned prior art wedges, however, have inadequate mechanical strength and are difficult to fabricate. And since the electromagnetic force has been increased with the development of a larger capacity electric rotating machine in recent years, increased mechanical strength is necessary.

More specifically, in the prior art example in which magnetic members are arranged only in the neighborhood of the core tooth portions at both sides of the wedge in its width direction and these magnetic members are unified by connecting them using non-magnetic materials or molding them of a plastics material, it is difficult to assure the mechanical strength at the connection portion between the magnetic members and non-magnetic materials and the resultant structure is likely to be complicated.

In the prior art example wherein the longitudinal direction of the flat surfaces of flat magnetic particles or the magnetic lines is aligned with that of the thickness of the wedge, it is difficult to uniformly align the magnetic particles or magnetic strips in the length direction of the wedge and also difficult to assure a mechanical strength that is sufficient to support the winding since the strength for the shearing force, which is important to fix the winding more stably in the slot is necessarily adapted to depend on the strength of the plastics member made of a suitable synthetic resin.

SUMMARY OF THE INVENTION

In view of the foregoing drawbacks of the prior art, it is an object of this invention to provide a magnetic wedge for use in an electric rotating machine, having a desired anisotropy and large mechanical strength (i.e. strong).

To attain this object, in accordance with this invention, there is provided a magnetic wedge wherein a set of magnetic strip layers are molded in a synthetic resin material; the magnetic strip layers are arranged in the width direction of the wedge at a predetermined inclination angle to the thickness direction of the wedge, the inclination angles of the adjacent magnetic strips in the longitudinal direction of the wedge being alternately different.

In the magnetic wedge thus formed, the magnetic strips are inclined from the thickness direction so that the efficient flux passing from the core tooth portion, with which one side of the wedge in the width direction is in contact, to the air gap side passes in the longitudinal direction of the magnetic strips and the magnetic resistance in this direction is small, thus providing the desired magnetic property of the wedge, on the other hand, the magnetic strips don't extend in the width direction of the wedge so that the leak magnetic flux passing the wedge in its width direction (from one tooth portion to an adjacent core tooth portion) passes between the magnetic strips arranged so as not to be directly in contact with each other, and so the magnetic resistance in this direction is large, thus reducing the magnetic flux leakage. Thus, the magnetic wedge according to this invention has a desired magnetic anisotropy.

Further, the magnetic wedge according to this invention consists of a group of magnetic strips alternately inclined so that this magnetic strip group serves as a matrix core member, thus improving the resistance to failure by shear in response to the forces applied in the thickness direction of the wedge.

DESCRIPTION OF THE PREFERRED EMBODIMENT

Figure 1:
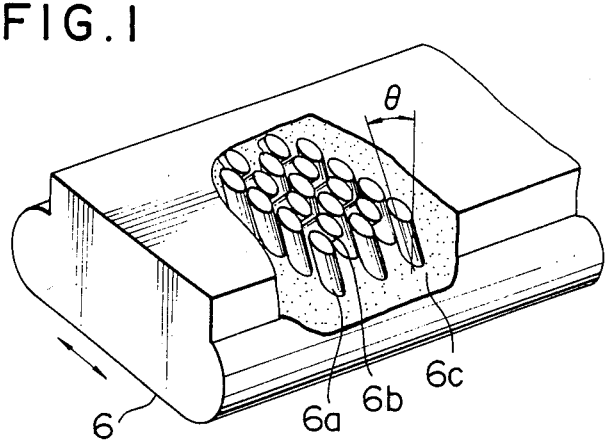
FIG. 1 is a partially broken perspective view of a short length of the magnetic wedge according to this invention.

This invention will be explained in detail using embodiments shown in the drawings.

Figure 2:
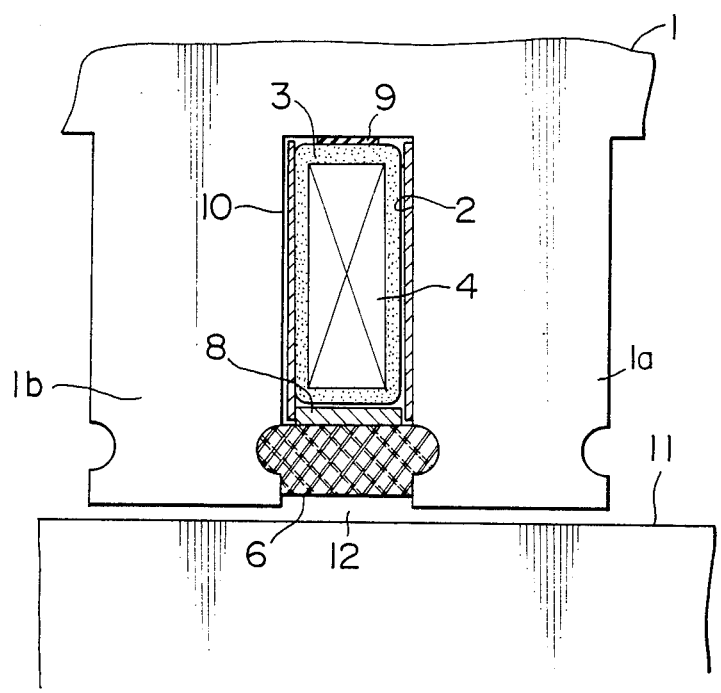
FIG. 2 is a sectional view of the principal part of a rotating electric machine showing the magnetic wedge of FIG. 1 in position.

FIG. 2 is a sectional view of the principal part of a rotary electric machine provided with a magnetic wedge according to this invention. As seen from FIG. 2, a stator winding 4 provided with an insulation 3 is mounted in a core slot 2 formed in a stator iron core 1. A magnetic wedge 6, which supports this winding 4, is provided at the opening portion of the slot.

The magnetic wedge 6 is engaged in the side wall of the core slot 2, i.e., groove at core tooth portions 1a and 1b, and so held there. Thus, the winding 4 is fixed and supported by the magnetic wedge 6.

8 and 9 are spacers for adjusting the dimension of the winding 4, in its height direction, in the core slot 2 and 10 is a spacer for adjusting the gap between the core slot 2 and the winding 4 in the width direction of the winding.

A rotor 11 is rotatably arranged in an inner hole of the stator core 1 via an air gap 12.

The magnetic wedge 6 is formed as follows. As shown in FIG. 1 in the partially broken state, a group of magnetic strips, i.e., many magnetic strips 6a and 6b which are not in contact with each other are juxtaposed in the direction inclined by a certain angle $\theta$ from the thickness direction to the width direction so that the magnetic strips have longitudinal axes that are oriented to be in planes perpendicular to the longitudinal dimension of the wedge, and the inclined magnetic strips 6a amd 6b thus formed are molded and fixed by a plastics material 6c such as synthetic resin, etc. thus to be embedded in such material.

The inclination angle $\theta$ of the magnetic strips 6a, 6b should be as large as possible from the viewpoint of the magnetic characteristic. However, it should be noted that the magnetic strips must not be inclined so large that both ends of the magnetic strips extend over the core tooth portions 1a and 1b at both sides of the core slot 2. This is because when the core tooth portions 1a and 1b at both sides of the slot 2 are magnetically short-circuited by the magnetic strips 6a and 6b, the magnetic wedge cannot perform its intrinsic function.

Although the magnetic strips 6a and 6b are juxtaposed in an inclined relation also to the width direction, it is desired that their inclination directions alternate rows across the width of the wedge, be different so that the adjacent magnetic strips 6a and 6b lying in adjacent rows in the longitudinal direction of the magnetic wedge as seen from FIGS. 1 and 2 have inclinations to the thickness of the wedge that are reversed.

Incidentially, in FIG. 2, the intervals between the adjacent magnetic strips are shown to be larger than the diameter of each magnetic strip solely for illustration purpose. Actually, this interval is as short as 1/10-1/5 of the magnetic strip diameter.

Figure 3:
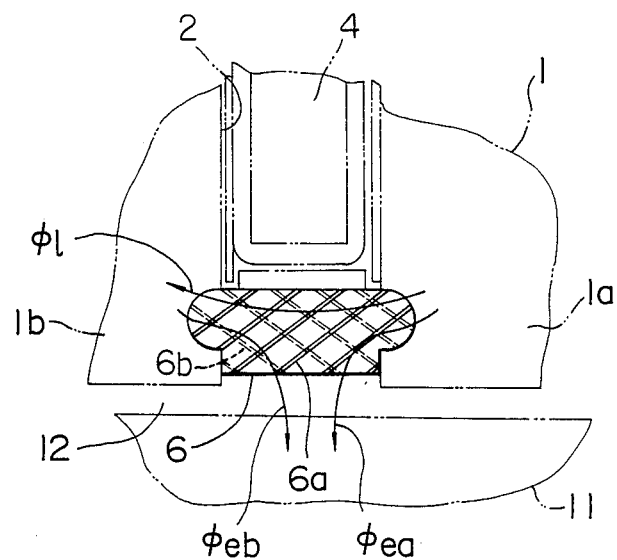
FIG. 3 is a sectional view showing the magnetic flux path of the parts shown in FIG. 2.

In the magnetic wedge 6 thus formed, as shown in FIG. 3, the magnetic resistance for the magnetic flux $\phi_{ea}$ passing from the core tooth portion 1a to the air gap 12 is small since the magnetic strips 6a are aligned with the passing direction. Similarly, the magnetic resistance for the magnetic flux $\phi_{eb}$ passing from the core tooth portion 1b to the air gap 12 is small since the magnetic strips 6b are aligned with the general direction of the magnetic flux. On the other hand, the magnetic resistance for the magnetic flux $\phi_e$ passing the wedge 6 in its width direction between core tooth portions 1a and 1b is large since the flux which enters the wedge at either side of the core tooth portion necessarily passes through the non-magnetic plastic layer at least once in the direction substantially perpendicular to the aligning direction of the magnetic strips 6a or 6b.

In the above explanation, the magnetic wedge according to this invention has been explained using one embodiment, but many other embodiments implementing the same technical idea as that in the above embodiment can be made.

Figure 4:
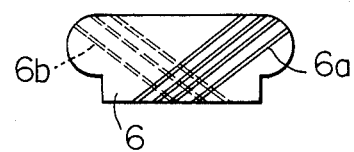
FIG. 4 is a sectional view of a magnetic wedge according to another embodiment of this invention.

FIG. 4 shows another embodiment of the magnetic wedge according to this invention. In this embodiment, the ends of magnetic strips 6a and 6b nearest the air gap 12 are concentrated at the central portion of the wedge in its width direction.

Such a construction permits a higher density of magnetic flux lines to pass the central portion of the slot opening in its width direction so that the uniformity of the flux distribution at the slot opening portion can be enhanced, thereby improving the magnetic property of the magnetic wedge.

In this case, the same effect can be obtained by arranging some of the magnetic strips have a different (i.e. large) permeability while arranging the remaining magnetic strips of lower permeability throughout the entirety of the wedge.

Further, magnetic particles may be scattered in the non-magnetic plastics molding material so that the permeability of the magnetic wedge can be minutely adjusted by varying the amount of the magnetic particles.

Moreover, non-magnetic fibers inclined at the side opposite to the inclination of the magnetic strips may be mixed in the mold in order to enhance the strength of the wedge.

Figure 5:
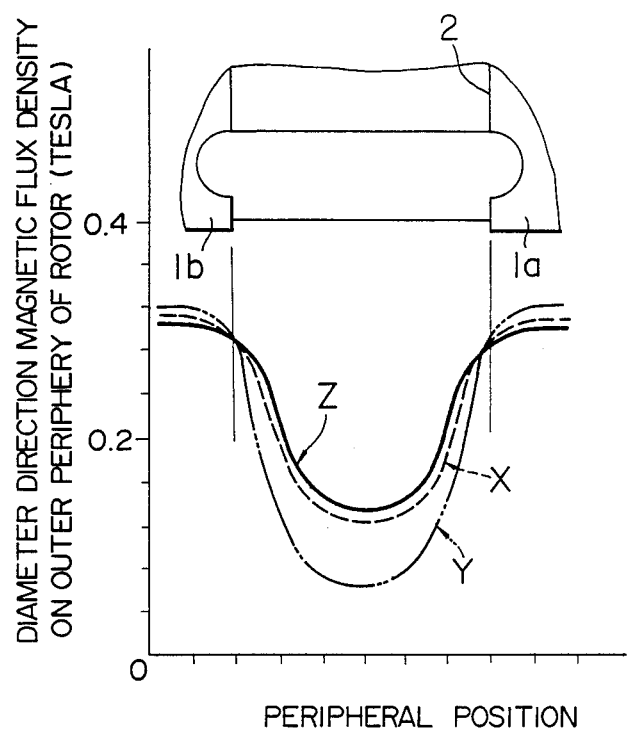
FIG. 5 is a graph showing the relation between the position of a core slot and the magnetic flux density.

Now referring to FIG. 5, the previously commonly used magnetic wedge and the magnetic wedge according to the invention will be compared in their effect. FIG. 5 is a graph showing the experimental result of the magnetic flux distribution at the gap between a stator core and a rotor, when using a sample wedge 1.3 mm wide and 4 mm thick (class of about 500 kw).

In this graph, a dotted curve X relates to the previously used magnetic wedge in which generally, magnetic members are arranged at both sides in the width direction of the wedge and resin is filled in the central portion. As seen from the graph, its magnetic flux distribution in the slot and core tooth portions is greatly improved as compared to that of a non-magnetic wedge illustrated by an wedge curve Y, but still has significant variations. On the other hand, the magnetic flux distribution of the magnetic wedge according to this invention, illustrated by solid curve Z is further flattened.

The flattening of the magnetic flux distribution at the core slot portion will greatly contribute to the decrease of the core loss due to the ripple magnetic flux on a rotor surface, prevent the temperature increase on the rotor surface and improve the efficiency of a rotating electric machine itself.

Figure 6:
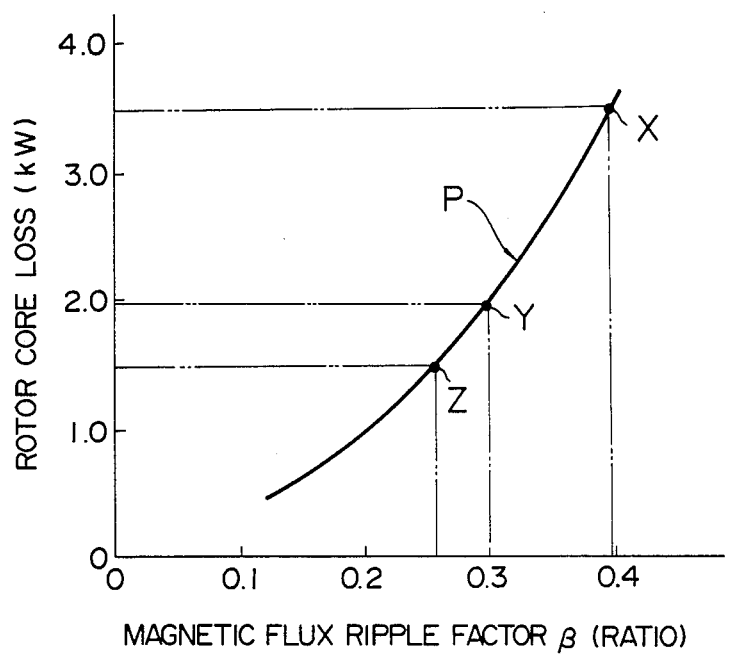
FIG. 6 is a graph showing the relation between the ripple factor and core loss.

FIG. 6 is a graph showing the relation between the ripple magnetic flux (ripple factor) and the core loss, illustrated by curve P. The ripple factor $\beta$ of the magnetic flux is represented by $$\beta = B_o \times 0.5 / B_{max} \qquad (1)$$

where $B_o$ is an amplitude and $B_{max}$ is a maximum magnetic flux.

The magnetic flux ripple factors of several wedges of the rotating electric machine of 500 kw class, i.e. the wedges corresponding to the curves X, Y and Z in FIG. 5 can be calculated by the above equation. The results are shown in the following table.

TABLE

|  | Magnetic flux ripple factor |
| --- | --- |
| non-magnetic wedge (Y) | 0.39 |
| Prior art magnetic wedge (X) | 0.30 |
| Magnetic wedge of this invention (Z) | 0.27 |

It can be seen from FIG. 6 that the core loss corresponding to each of the above ripple factors is 3.5 (kw) in the prior art non-magnetic wedge Y, 1.98 (kw) in the prior art magnetic wedge x and 1.5 (kw) in the magnetic wedge of this invention Z. Although the prior art magnetic wedge has a greatly reduced core loss, the magnetic wedge of this invention has a further reduced core loss, which verifies the superiority of the magnetic wedge of this invention.

As described above, in the magnetic wedge according to this invention, a desired magnetic property is obtained since a group of magnetic strips inclined from the thickness direction to the width direction by a predetermined angle and another group of magnetic strips inclined towards the side opposite to the above group of magnetic strips are alternately arranged in the longitudinal direction so that the magnetic resistance for the magnetic flux passing from the core tooth portions to the air gap is small while the magnetic resistance for the magnetic flux passing the magnetic wedge in the width direction, i.e., passing from one core tooth portion to another adjacent core tooth portion is large. The mechanical strength of the wedge can be also improved since the magnetic strips are arranged at alternately opposite inclination angles. Thus, in accordance with this invention, a magnetic wedge for use in a rotating electric machine, having a good magnetic property and improved mechanical strength can be provided.

We claim:

1. A magnetic wedge for use in an electromagnetic device, said wedge having a longitudinal dimension which extends along an opening portion of a core slot for receiving a winding and a thickness dimension in a plane perpendicular to said longitudinal dimension and in the direction of the depth of the core slot, said wedge comprising:

a group of strips of magnetic material embedded in a molded body of a plastics material in a non-contacting arrangement;

said strips having longitudinal axes that are oriented to be in planes perpendicular to the longitudinal dimension of the wedge and in directions that correspond to a predetermined angle of inclination with respect to the thickness dimension of the wedge; and the inclination angle of the magnetic strips being alternately different in adjacent planes along the longitudinal axis of said wedge.

2. A magnetic wedge as defined in claim 1, wherein said strips of magnetic material are arranged in rows which are aligned with the planes that are perpendicular to the longitudinal dimension of the wedge so that the end of the strips in one row face toward to one core tooth portion and ends of the strips in an adjacent row face toward to an adjacent core tooth portion.

3. A magnetic wedge as defined in claim 1, wherein magnetic particles are scattered throughout the plastics material.

4. A magnetic wedge for use in an electromagnetic device, arranged at an opening portion of a core slot for receiving a winding, comprising:

a magnetic member consisting of a group of adjacent magnetic strips arranged in non-contact from one another, in the direction perpendicular to the longitudinal direction of the wedge and with a predetermined inclination angle for the thickness direction of the wedge, the inclination angles of the adjacent magnetic strips in the longitudinal direction of the wedge being alternately different, and a plastic member for molding said magnetic member.

5. A magnetic wedge for use in an electromagnetic device, arranged at an opening portion of a core slot for receiving a winding, comprising:

a magnetic member consisting of a group of adjacent magnetic strips arranged in non-contact from one another, in the direction perpendicular to the longitudinal direction of the wedge and with a predetermined inclination angle for the thickness direction of the wedge, the inclination angles of the adjacent magnetic strips in the longitudinal direction of the wedge being alternately different, and a plastic member for molding said magnetic member, within which magnetic particles are scattered.

* * * * *